(12) United States Patent
Miura

(10) Patent No.: US 7,539,804 B2
(45) Date of Patent: May 26, 2009

(54) COMMUNICATION APPARATUS

(75) Inventor: Hisanori Miura, Gamagori (JP)

(73) Assignee: Denso Corporation, Kariya (JP)

( * ) Notice: Subject to any disclaimer, the term of this patent is extended or adjusted under 35 U.S.C. 154(b) by 168 days.

(21) Appl. No.: 11/703,860

(22) Filed: Feb. 8, 2007

(65) Prior Publication Data
US 2007/0233919 A1 Oct. 4, 2007

(30) Foreign Application Priority Data
Feb. 13, 2006 (JP) ............................. 2006-035246

(51) Int. Cl.
*G06F 13/00* (2006.01)
(52) U.S. Cl. .................. 710/110; 710/104; 280/735; 280/736; 280/737; 280/738
(58) Field of Classification Search ................ 710/110, 710/104; 280/735–738
See application file for complete search history.

(56) References Cited

U.S. PATENT DOCUMENTS

| | | | | | |
|---|---|---|---|---|---|
| 5,076,375 | A | * | 12/1991 | Dillon et al. ................... | 177/45 |
| 5,333,675 | A | * | 8/1994 | Mullis et al. ................ | 165/268 |
| 5,544,915 | A | * | 8/1996 | Fendt et al. ................. | 280/735 |
| 6,744,376 | B1 | * | 6/2004 | Pascalidis .............. | 340/870.21 |
| 6,745,270 | B1 | * | 6/2004 | Barenys et al. .............. | 710/104 |
| 7,085,863 | B2 | * | 8/2006 | Barenys et al. .............. | 710/104 |
| 7,481,453 | B2 | * | 1/2009 | Breed .......................... | 280/738 |
| 2002/0099486 | A1 | * | 7/2002 | Nagao et al. ................... | 701/45 |
| 2006/0021815 | A1 | * | 2/2006 | Ohtaka ........................ | 180/274 |

FOREIGN PATENT DOCUMENTS

| | | |
|---|---|---|
| JP | 57-168333 | 10/1982 |
| JP | 08-108597 | 1/1996 |
| JP | 11-053305 | 2/1999 |
| JP | 2000-244516 | 9/2000 |
| JP | 2005-159791 | 6/2005 |

OTHER PUBLICATIONS

Komaki et al. Development of the electronic "Safing" system for airbag ECUs. Fujitsu Ten Tech. J. No. 24. 2005.Lin.*
Lin et al. Developement of Simulation Based Side Airbag Algorithm. DYNAmore GmbH. 2008.*
Zhang et al. Evaluation and Comparison of CFD Integrated Airbag Models in LS-DYNA, MADYMO and Pam-Crash. CAE Methods for Vehicle Crashworthiness and Occupant Safety, and Safety-Critical Systems. 2004.*
Safe-By-Wire Automotive Safety Restraints Bus Specification Version 1.0, 53 pg. Dated: Jan. 12, 2003.
"Road Vehicles—Deployment and Sensor Bus for Passenger Safety Systems", ISO/IEC DIS 22896, Sep. 15, 2005.

* cited by examiner

*Primary Examiner*—Mark Rinehart
*Assistant Examiner*—Matthew D Spittle
(74) *Attorney, Agent, or Firm*—Harness, Dickey & Pierce, PLC

(57) ABSTRACT

An airbag ECU includes a communication bus connection circuit for connecting communication buses to communication circuits. A central control circuit connects some of the communication buses to the communication circuits with the communication bus connection circuit and sets addresses for some of slave sensor devices. When those addresses are set, the other communication buses are connected to the communication circuits by the communication bus connection circuit, and addresses for the other slave sensor devices are set. Thus, a circuit can be made simpler without any influence on address setting, thus reducing cost and size of an airbag apparatus.

12 Claims, 6 Drawing Sheets

COMMUNICATION APPARATUS

CROSS REFERENCE TO RELATED APPLICATION

This application is based on and incorporates herein by reference Japanese Patent Application No. 2006-35246 filed on Feb. 13, 2006.

FIELD OF THE INVENTION

The present invention relates to a communication apparatus having a master device and a plurality of slave devices, which are daisy-chain-connected through a plurality of communication buses.

BACKGROUND OF THE INVENTION

Recently, many vehicles are equipped with passenger protection apparatuses for protecting a passenger at the time of a collision of the same. For example, such passenger protection apparatus include passenger protection apparatus as defined in Safe-by-Wire Automotive Safety Restraints Bus Specification Version 1.0. The passenger protection apparatus includes a plurality of sensors, communication buses, and an electronic controller. Each of the plurality of sensors includes a switch therein and is daisy-chain-connected to the controller through a communication bus. At the time of initial setting, the switches in the sensors are sequentially connected to set addresses for all of the sensors sequentially based on address data serially transmitted from the controller. When the initial setting is completed, various data are serially transmitted between the controller and the plurality of sensors. Since addresses can be set at the time of initial setting as thus described, there is no need for setting an address specific to each sensor in advance. This is advantageous in that sensors can be used on a common basis.

To set addresses at the time of initial setting and to serially transmit various data after the initial setting is completed, the controller includes a communication circuit for each communication bus. It is most preferable to connect all sensors to one communication circuit through one communication bus because a simple configuration can be provided. In practice, however, a plurality of sensors must be connected to the controller through separate communication buses in most cases because of restrictions on the time for data transmit between the controller and the sensors and restrictions on communication bus wiring on the vehicle. For this reason, the number of communication buses is increased. As a result, the number of communication buses is also increased. This has made it difficult to keep the cost of a passenger protection apparatus low. It has been also difficult to provide a passenger protection apparatus in a small size.

SUMMARY OF THE INVENTION

It is an object of the present invention to provide a communication apparatus which can simplify circuitry by reducing the number of communication circuits without influencing the setting of addresses of slave devices.

According to one aspect of the invention, a communication apparatus comprises a master device, a plurality of communication buses, a plurality of slave devices. The master device has a communication circuit for transmitting and receiving serial data. The communication buses transmit the serial data therethrough. The slave devices are daisy-chain-connected to the communication circuit through respective ones of the communication buses for transmitting and receiving serial data to and from the communication circuit. The master device further has a communication bus connecting circuit for sequentially connecting the plurality of communication buses to the communication circuit. The communication circuit sets addresses for the slave devices through the plurality of communication buses at the time of initial setting, and thereafter transmits and receives serial data to and from the plurality of slave devices using the set addresses.

Preferably, the master device connects one of the communication buses to the communication circuit by the communication bus connecting circuit to set an address for one of the slave devices daisy-chain-connected to the one of the communication buses, and sequentially connects another of the communication buses to sequentially set addresses for another of the slave devices daisy-chain-connected to the another of the communication buses after the address is set for the one of the slave devices.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The invention will now be described in more details with reference to preferred embodiments, in which a communication apparatus is incorporated in an airbag system for protecting a passenger of a vehicle.

First Embodiment

Figure 1:
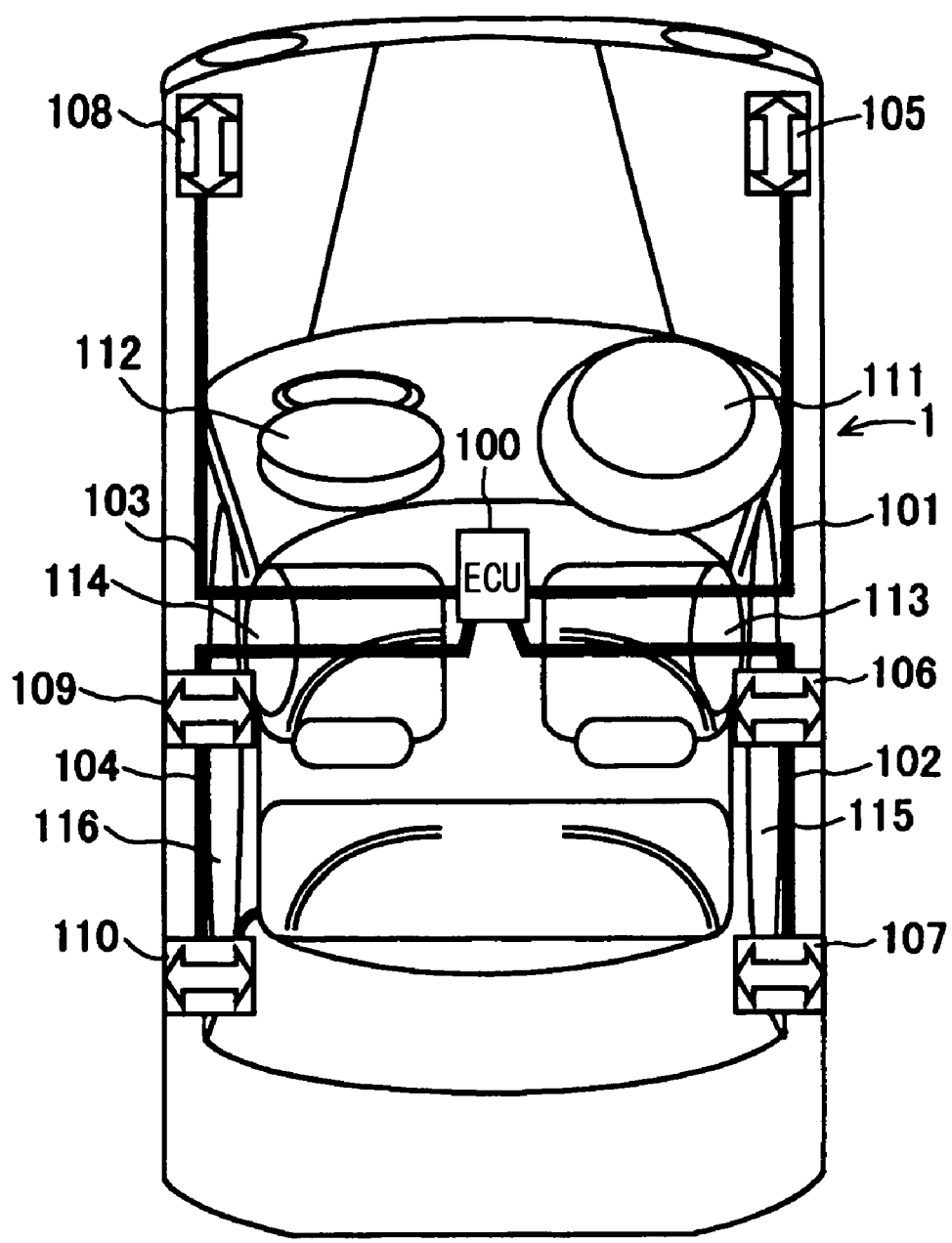
FIG. 1 is a schematic plan view of a vehicle having a communication apparatus according to a first embodiment of the invention.

Referring first to FIG. 1, an airbag apparatus 1 (communication apparatus) includes an airbag ECU 100 (master device or electronic controller), communication buses 101 to 104, slave sensor devices 105 through 110 (slave devices or sensors), a front airbag 111 for a driver's seat, a front airbag 112 for a passenger seat, side airbags 113 and 114, and curtain airbags 115 and 116.

The airbag ECU 100 is for inflating the driver's seat airbag 111, the passenger seat airbag 112, the side airbags 113 and 114, and the curtain airbags 115 and 116 based on acceleration detected by the slave sensor devices 105 through 110a and an internal sensor device 100f (FIG. 2) provided inside the ECU 100. The airbag ECU 100 is located substantially in the middle of the vehicle.

The communication buses 101 to 104 are signal lines for supplying voltages from the airbag ECU 100 to the slave sensor devices 105 through 110 and for allowing commands and data to be transmitted and received between the airbag ECU 100 and the slave sensor devices 105 through 110.

The slave sensor devices 105 through 110 are for detecting acceleration at each part of the vehicle and transmitting results of detection through the communication buses 101 to 104 in response to data transmission requests from the airbag ECU 100. The slave sensor device 105 is for detecting forward and backward acceleration of the vehicle, and located in the right front part of the vehicle. The slave sensor device 106 and 107 are for detecting sideward acceleration of the vehicle, and located in the vicinity of a C pillar and a B pillar on the right side of the vehicle, respectively. The slave sensor device 105 and the couple of slave sensor device 106, 107 are daisy-chain-connected to the airbag ECU 100 through the communication bus 101 and the communication bus 102, respectively. The slave sensor device 108 is for detecting forward and backward acceleration of the vehicle, and is located on the left side of the vehicle. The slave sensor device 109 and 110 are for detecting sideward acceleration of the vehicle, and they are located in the vicinity of a C pillar and a B pillar on the left side of the vehicle, respectively. The slave sensor device 108 and the couple of slave sensor device 109, 110 are daisy-chain-connected to the airbag ECU 100 through the communication bus 103 and the communication bus 104, respectively.

Figure 2:
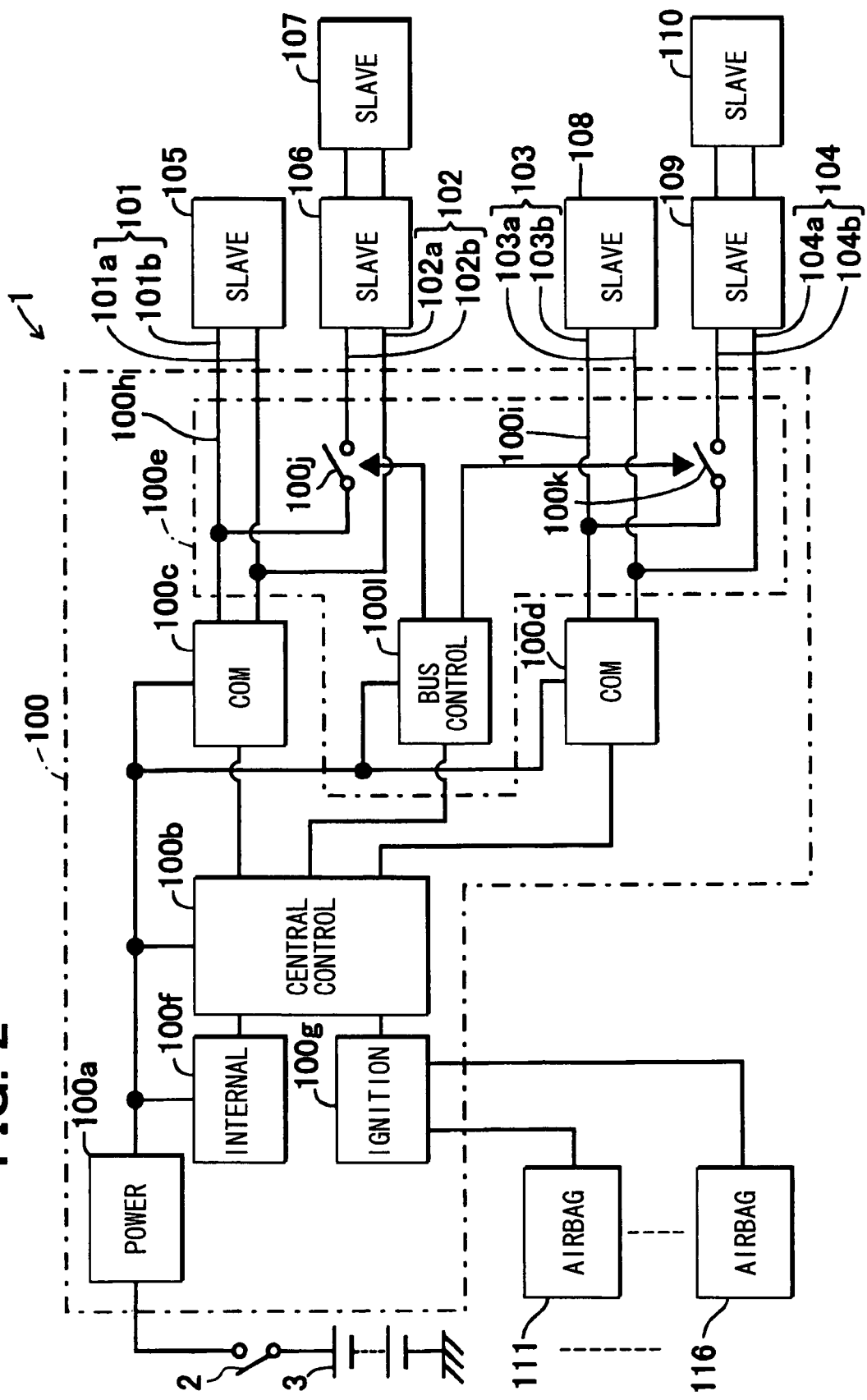
FIG. 2 is a block diagram of the communication apparatus in the first embodiment.

As shown in FIG. 2, the airbag ECU 100 includes a power supply circuit 100a, a central control circuit 100b, communication circuits 100c and 100d, a communication bus connection circuit 100e, an internal sensor device 100f, and an ignition circuit 100g.

The power supply circuit 100a is for supplying a power supply voltage suitable for operations of the central control circuit 100b, the communication circuits 100c and 100d, the communication bus connection circuit 100e, and the internal sensor device 100f by converting an output voltage from a battery 3 supplied through an ignition switch 2. An input terminal of the power supply circuit 100a is connected to a positive terminal of the battery 3 through the ignition switch 2, and a negative terminal of the battery 3 is grounded to the vehicle chassis. An output terminal of the battery 3 is connected to a power supply terminal of each of the central control circuit 100b, the communication circuits 100c and 100d, the communication bus connection circuit 100e, and the internal sensor device 100f.

The central control circuit 100b is connected to each of the communication circuits 100c and 100d, the communication bus connection circuit 100e, the internal sensor device 100f, and the ignition circuit 100g. The central control circuit 100b is for collecting acceleration data from the slave sensor devices 105 through 110 through the communication circuits 100c and 100d, uses the data along with acceleration data from the internal sensor device 100f to determine whether to inflate each of the airbags 111 to 116 or not, and controls the ignition circuit 100g based on the result of the determination. The central control circuit 100b outputs a control command to the communication bus connection circuit 100e to control the communication bus connection circuit 100e when initial setting is made immediately after the operation is started. Address setting commands for the slave sensor devices 105 through 110 are output to the communication circuits 100c and 100d. The address setting commands are for setting an address specific to each of the slave sensor devices 105 through 110. When the initial setting is completed, the central control circuit 100b outputs data transmission request commands for the slave sensor devices 105 through 110 to the communication circuits 100c and 100d. The data transmission request commands designate the slave sensor devices 105 through 110 using their addresses to request them to transmit data. It is determined whether each of the airbags 111 to 116 is to be inflated or not based on the acceleration data from the slave sensor devices 105 through 110 output by the communication circuits 100c and 100d and the acceleration data output by the internal sensor device 100f. Further, an ignition signal is output to the ignition circuit 100g based on the result of the determination. The ignition signal is output only for the airbag to be inflated.

The communication circuits 100c and 100d are for supplying the power supply voltage to the slave sensor devices 105 through 110 through the communication buses 101 to 104 and for transmitting and receiving the address setting commands, responses to the address setting commands, the data transmission request commands, and the acceleration data to and from the slave sensor devices 105 through 110. Each of the communication circuits 100c and 100d has one input/output port. The communication circuits 100c and 100d supply the power supply voltage to the slave sensor devices 105 through 110 through the communication buses 101 to 104.

When initial setting is made immediately after the operation is started, the communication circuits 100c and 100d superimpose the address setting commands for the slave sensor devices 105 through 110 output by the central control circuit 100b on the power supply voltage and serially transmit the commands in synchronism with a clock that is internally generated. The address setting commands are represented by, for example, voltage changes, and they have a value 1 or 0 which is determined by the ratio between a high level and a low level in one period of the clock. Further, responses to the address setting commands serially transmitted from the slave sensor devices 105 through 110 are output to the central control circuit 100b. Further, the responses to the address setting commands serially transmitted from the slave sensor devices 105 through 110 are output to the central control circuit 100b. The responses to the address setting commands are represented by, for example, current changes, and they have a value 1 or 0 which is determined depending on whether a current level is higher than a predetermined value or not when one half period has passed after the beginning of one period of the clock.

When the initial setting is completed, the communication circuits 100c and 100d superimpose the data transmission request commands for the slave sensor devices 105 through 110 output by the central control circuit 100b on the power supply voltage and serially transmit the commands in synchronism with the clock. The data transmission request commands are similar to the address setting commands in that they have a value 1 or 0 which is determined by a voltage change. Acceleration data serially transmitted from the slave sensor devices 105 through 110 in synchronism with subsequent data transmission request commands are output to the central control circuit 100b. The acceleration data are similar to the responses to the address setting commands in that they have a value 1 or 0 which is determined by a current change. The input/output ports of the communication circuits 100c and 100d are connected to the communication buses 101 to 104, respectively, through the communication bus connection circuit 100e. The communication circuits 100c and 100d are connected to the central control circuit 100b.

The communication bus connection circuit 100e is for connecting the communication buses 101 and 102 to the communication circuit 100c and connecting the communication buses 103 and 104 to the communication circuit 100d based on control commands output by the central control circuit 100b. The communication bus connection circuit 100e includes bus connection wirings 100h and 100i, bus switches 100j and 100k, and a bus switch control circuit 100l.

The bus connection wirings 100h and 100i are wirings which normally connect the communication buses 101 and 103 to the communication circuits 100c and 100d, respectively. The bus switches 100j and 100k are, for example, switching elements, for connecting the communication buses 102 and 104 to the communication circuits 100c and 100d. The bus switches 100j and 100k are connected to the input/output ports of the communication circuits 100c and 100d, respectively, at one end thereof and connected to transmission lines 102b and 104b of the communication buses 102 and 104, respectively, at the other end thereof. The bus switch control circuit 100l is for controlling the turning on/off of the bus switches 100j and 100k based on control commands output by the central control circuit 100b. An input terminal of the bus switch control circuit 100l is connected to the central control circuit 100b, and output terminals of the circuit 100l are connected to control terminals of the bus switches 100j and 100k. The communication circuits 100c and 100d, the bus switches 100j and 100k, and the bus switch control circuit 100l are integrally configured as an integrated circuit.

The internal sensor device 100f is provided in the airbag ECU 100 and detects forward and backward acceleration of the vehicle and outputs it to the central control circuit 100b. The internal sensor device 100f is connected to the central control circuit 100b.

The ignition circuit 100g is for inflating the airbags 111 to 116 based on the ignition signal output by the central control circuit 100b. The ignition circuit 100g is connected to the central control circuit 100b and each of the airbags 111 to 116.

The communication buses 101 to 104 are wirings for transmitting commands and data to be transmitted and received between the airbag ECU 100 and the slave sensor devices 105 through 110. The communication buses 101 to 104 include reference lines 101a to 104a and transmission lines 101b to 104b, respectively.

Figure 3:
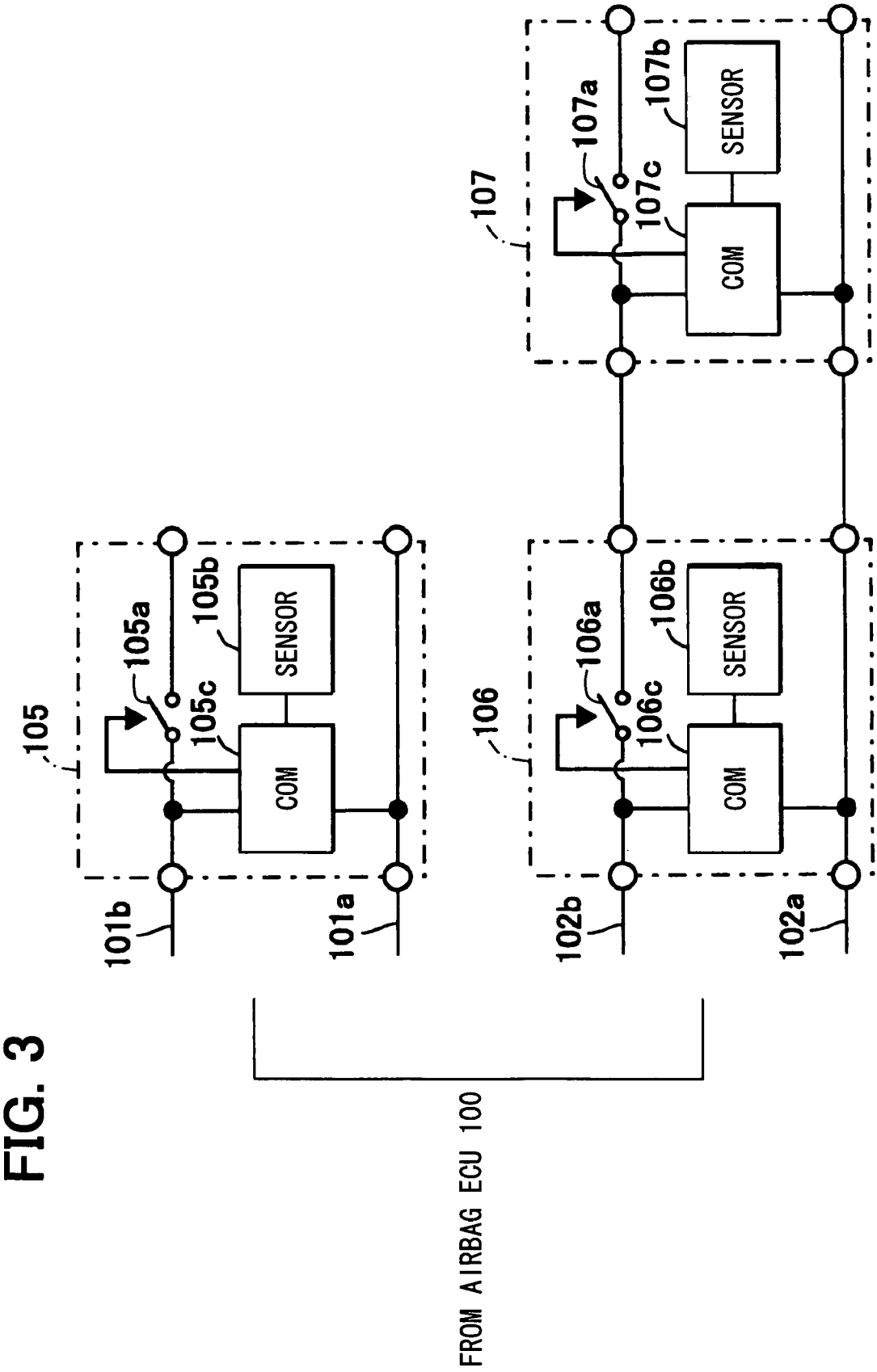
FIG. 3 is a block diagram of slave sensors of the communication apparatus in the first embodiment.

The slave sensor devices 105 through 110 will be described in more details. Since the slave sensor devices 105 through 110 are identical in configuration, a description will be made with reference to FIG. 3 on the slave sensor device 106 which is connected in series with the slave sensor device 107. As shown in FIG. 3, the slave sensor device 106 includes a bus switch 106a, a sensor 106b, and a communication circuit 106c.

The bus switch 106a is for connecting the transmission line 102b upstream of the same connected to the slave sensor device 106 to the transmission line 102b downstream of the same. The bus switch 106a is turned on based on a command from the communication circuit 106c to supply the power supply voltage transmitted from the communication circuit 100c of the airbag ECU 100 to the slave sensor device 107 provided downstream of the same. The switch also transmits an address setting command and a data transmission-command transmitted from the communication circuit 100c to the slave sensor device 107 downstream thereof. Further, the switch transmits a response to the address setting command transmitted from the slave sensor device 107 downstream thereof and acceleration data to the communication circuit 100c. One end of the bus switch 106a is connected to the transmission line 102b upstream thereof, and another end of the switch is connected to the transmission line 102b downstream thereof. The control terminal is connected to the communication circuit 106c.

The sensor 106b is for detecting acceleration and outputs acceleration data to the communication circuit 106c. The sensor 106b is connected to the communication circuit 106c.

The communication circuit 106c is for supplying the power supply voltage to the sensor 106b and for transmitting and receiving the address setting command, the response to the address setting command, the data transmission request command, and the acceleration data to and from the airbag ECU 100. The communication circuit 106c supplies the power supply voltage supplied from the communication circuit 100c to the sensor 106b. At the time of initial setting, the communication circuit 106c receives the address setting command for the slave sensor device 106 serially transmitted from the communication circuit 100c to set an address specific to the sensor. When the address setting is completed, the circuit 106c serially transmits a response to the address setting command to the communication circuit 100c. Thereafter, the communication circuit 106c outputs an on-command to the bus switch 106a. When the initial setting is completed, the communication circuit 106c receives the data transmission request command serially transmitted from the communication circuit 100c and determines whether the circuit itself is the object of communication or not based on the address thus set. When the circuit 106c is the object of communication, it serially transmits acceleration data output by the sensor 106b to the communication circuit 100c in synchronism with a subsequent data transmission request command.

The operation of the airbag apparatus 1 will now be described with reference to FIGS. 2 and 3. Referring to FIG. 2, when the ignition switch 2 is turned on for vehicle operation, the power supply circuit 100a supplies the power supply voltage suitable for operations of the central control circuit 100b, the communication circuits 100c and 100d, the communication bus connection circuit 100e, and the internal sensor device 100f by converting the output voltage from the battery 3. At this time, all of the bus switches 100j and 100k of the communication bus connection circuit 100e and the bus switches of the slave sensor devices 105 through 110 are in the off-state. The communication circuits 100c and 100d supply the power supply voltage to the slave sensor devices 105 and 108 through the bus connection wirings 100h and 100i of the communication bus connection circuit 100e and the communication buses 101 and 103. When the power supply voltage is supplied, the central control circuit 100b, the communication circuits 100c and 100d, the communication bus connection circuit 100e, the internal sensor device 100f, and the slave sensor devices 105 and 108 start operating.

When the initial setting is made immediately after the operation starts, the central control circuit 100b outputs address setting commands for the slave sensor devices 105 and 108 to the communication circuits 100c and 100d. The communication circuits 100c and 100d superimpose the address setting commands on the power supply voltage and serially transmit the commands through the bus connection wirings 100h and 100i and the communication buses 101 and 103.

Referring to FIG. 3, a communication circuit 105c of the slave sensor device 105 receives the address setting command and sets an address specific to itself. When the address setting is completed, the circuit serially transmits a response to the address setting command to the communication circuit 100c. Further, the circuit outputs an on-command to a bus switch 105a to turn the bus switch 105a on. Similarly, the address of the slave sensor device 108 is set.

Referring to FIG. 2, the communication circuits 100c and 100d output the responses to the address setting commands serially transmitted from the slave sensor devices 105 and 108 to the central control circuit 100*b*. The central control circuit 100*b* determines that the address setting for the slave sensor devices 105 and 108 has been completed and outputs a control command to the communication bus connection circuit 100*e*. The bus switch control circuit 100*l* of the communication bus connection circuit 100*e* turns the bus switches 100*j* and 100*k* on based on the control command. Thus, the communication buses 102 and 104 are connected to the communication circuits 100*c* and 100*d*. The communication circuits 100*c* and 100*d* supply the power supply voltage to the slave sensor devices 106 and 109 through the bus switches 100*j* and 100*k* and the communication buses 102 and 104. When the power supply voltage is supplied, the slave sensor devices 106 and 109 start operating. Thereafter, the central control circuit 100*b* outputs address setting commands for the slave sensor devices 106 and 109 to the communication circuits 100*c* and 100*d*. The communication circuits 100*c* and 100*d* serially transmit the address setting commands through the bus switches 100*j* and 100*k* and the communication buses 102 and 104. At this time, although the address setting commands are transmitted also to the slave sensor devices 105 and 108 through the bus connection wirings 100*h* and 100*i* and the communication buses 101 and 103, the slave sensor devices 105 and 108 are not affected by the commands because their addresses have already been set.

Referring to FIG. 3, the communication circuit 106*c* receives the address setting command to set an address specific to itself. At this time, the bus switch 106*a* is in the off-state, and the address setting command is not transmitted downstream of the slave sensor device 106. When the address setting is completed, the circuit serially transmits a response to the address setting command to the communication circuit 100*c*. Further, the circuit outputs an on-command to the bus switch 106*a* to turn the bus switch 106*a* on. When the bus switch 106*a* is turned on, the power supply voltage is supplied, and the slave sensor device 107 starts operating. The address of the slave sensor device 109 is similarly set. Further, addresses are similarly set for the slave sensor devices 107 and 111 which are daisy-chain-connected downstream of the slave sensor devices 106 and 109 through the communication buses 102 and 104.

Referring to FIG. 2, when the initial setting is completed, the central control circuit 100*b* outputs data transmission request commands for the slave sensor devices 105 through 110 to the communication circuits 100*c* and 100*d*. The communication circuit 100*c* sequentially and serially transmits the data transmission request commands through the bus connection wirings 100*h* and 100*i*, the communication buses 101 and 103, the bus switches 100*j* and 100*k*, and the communication buses 102 and 104. Upon receipt of the data transmission request commands, the slave sensor devices 105 through 107 determine whether the sensors themselves are the object of communication or not based on the set addresses. When they are the object of communication, the sensors sequentially and serially transmit detected acceleration data to the communication circuits 100*c* and 100*d* in synchronism with subsequent data transmission request commands. The communication circuits 100*c* and 100*d* sequentially output the serially transmitted acceleration data to the central control circuit 100*b*.

The central control circuit 100*b* determines whether to inflate each of the airbags or not based on acceleration data from the slave sensor devices 105 through 110 collected as described above and acceleration data from the internal sensor device 100*f*. Further, the circuit 100*b* outputs an ignition signal to the ignition circuit 100*g* based on the result of the determination. The ignition circuit 100*g* inflates the airbags to protect the passengers on the vehicle based on the ignition signal output from the central control circuit 100*b*.

According to the present embodiment, at the time of the initial setting carried out immediately after the operation is started, the central control circuit 100*b* can set the addresses of the slave sensor devices 105 and 108 by connecting the communication buses 101 and 103 to the communication circuits 100*c* and 100*d* through the bus connection wirings 100*h* and 100*i* of the communication bus connection circuit 100*e*. When the address setting for the slave sensor devices 105 and 108 is completed, the addresses of the slave sensor device 106, 107, 109, and 110 can be set by connecting the communication buses 102 and 104 to the communication circuits 100*c* and 100*d* with the bus switches 100*j* and 100*k* of the communication bus connection circuit 100*e*. Thus, the communication buses 101 to 104 can be sequentially connected to the communication circuits 100*c* and 100*d* in a reliable manner, and the addresses of all of the slave sensor devices 105 through 110 can be reliably set. As a result, four communication circuits required in the related art to serve each of the communication buses 101 to 104 can be reduced to the two communication circuits 100*c* and 100*d* without any influence on address setting for the slave sensor devices 105 through 110, which makes it possible to provide a simpler circuit. It is therefore possible to provide the airbag apparatus 1 at a low cost and to make the airbag apparatus 1 compact.

Further simplification of the circuit can be achieved because the communication circuits 100*c* and 100*d*, the bus switches 100*j* and 100*k*, and the bus switch control circuit 100*l* are integrally configured as an IC.

Second Embodiment

In an airbag apparatus of the second embodiment, a communication bus connection circuit is different from the airbag apparatus 1 of the first embodiment.

Figure 4:
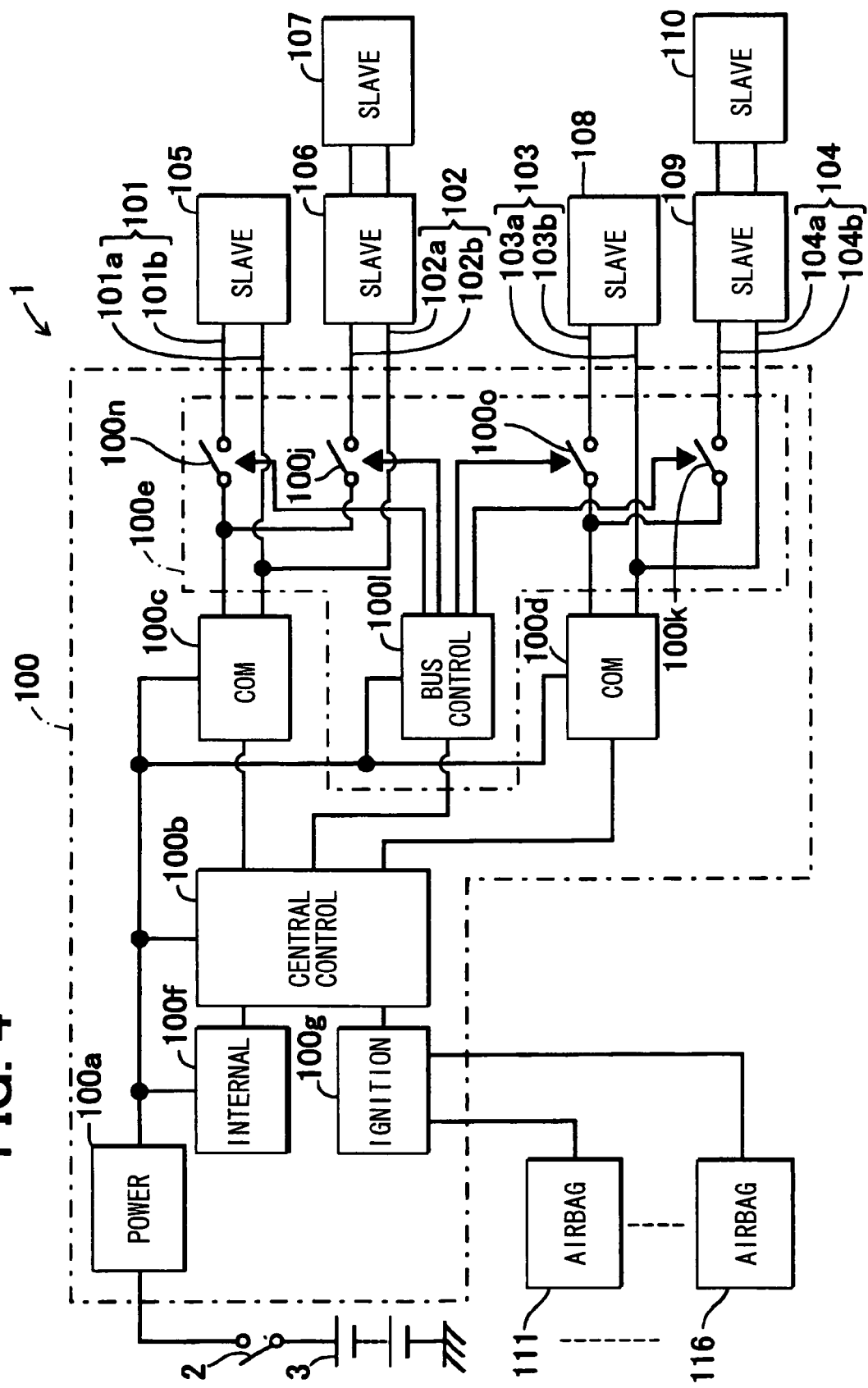
FIG. 4 is a block diagram of a communication apparatus according to a second embodiment of the invention.

As shown in FIG. 4, the communication bus connection circuit 100*e* of the airbag ECU 100 includes additionally bus switches 100*n* and 100*o*. The bus switches 100*n* and 100*o* are for connecting the communication buses 101 and 103 to the communication circuits 100*c* and 100*d*, respectively. The bus switches 100*n* and 100*o* are connected to the input/output ports of the communication circuits 100*c* and 100*d*, respectively, at one ends thereof and connected to transmission lines 101*b* and 103*b* of the communication buses 101 and 103, respectively, at the other ends thereof. The bus switch control circuit 100*l* controls the switching of the bus switches 100*j*, 100*k*, 100*n* and 100*o* based on control commands output from the central control circuit 100*b*. An input terminal of the bus switch control circuit 100*l* is connected to the central control circuit 100*b*, and output terminals of the circuit 100*l* are connected to control terminals of the bus switches 100*j*, 100*k*, 100*n* and 100*o*.

In operation, when the ignition switch 2 is turned on and the power supply voltage is supplied, the central control circuit 100*b*, the communication circuits 100*c* and 100*d*, the communication bus connection circuit 100*e*, the internal sensor device 100*f*, and the slave sensor devices 105 and 108 start operating.

The central control circuit 100*b* outputs control commands to the communication bus connection circuit 100*e*. The bus switch control circuit 100*l* of the communication bus connection circuit 100*e* turns the bus switches 100*n* and 100*o* on based on the control commands. Thus, the communication buses 101 and 103 are connected to the communication circuits 100*c* and 100*d*. The communication circuits 100*c* and 100*d* supply the power supply voltage to the slave sensor devices 105 and 108 through the bus switches 100n and 100o and the communication buses 101 and 103. When the power supply voltage is supplied, the slave sensor devices 105 and 108 start operating. Thereafter, the central control circuit 100b sets the addresses of the slave sensor devices 105 through 110 in the same manner as in the first embodiment.

When the initial setting is completed, the central control circuit 100b collects acceleration data from the slave sensor devices 105 through 110 in the same manner as in the first embodiment. For example, in the case of a failure at the slave sensor device 105, the central control circuit 100b determines that the slave sensor device 105 has failed based on the acceleration data thus collected and outputs a control command for disconnecting the communication bus 101 to the communication bus connection circuit 100e. The bus switch control circuit 100l of the communication bus connection circuit 100e turns the bus switch 100n off based on the control command, whereby only the communication bus 101 connected to the slave sensor device 105 having a failure is disconnected from the airbag ECU 100.

The central control circuit 100b determines whether to inflate each of the airbags or not based on acceleration data from the slave sensor devices 106 to 110 thus collected and acceleration data from the internal sensor device 100f without being affected by the slave sensor device 105 having a failure. Further, the circuit outputs an ignition signal to the ignition circuit 100g based on the result of the determination. The ignition circuit 100g inflates the airbags to protect the passengers of the vehicle based on the ignition signal output from the central control circuit 100b.

According to the second embodiment, at the time of the initial setting carried out immediately after the operation is started, the central control circuit 100b can set the addresses of the slave sensor devices 105 and 108 by connecting the communication buses 101 and 103 to the communication circuits 100c and 100d through the bus switches 100n and 100o of the communication bus connection circuit 100e. When the address setting for the slave sensor devices 105 and 108 is completed, the addresses of the slave sensor devices 106, 107, 109, and 110 can be set by connecting the communication buses 102 and 104 to the communication circuits 100c and 100d with the bus switches 100j and 100k of the communication bus connection circuit 100e. Thus, the communication buses 101 to 104 can be sequentially connected to the communication circuits 100c and 100d in a reliable manner, and the addresses of all of the slave sensor devices 105 through 110 can be reliably set. As a result, four communication circuits required in the related art to serve each of the communication buses 101 to 104 can be reduced to the two communication circuits 100c and 100d without influencing address setting for the slave sensor devices 105 through 110, which makes it possible to provide a simpler circuit. It is therefore possible to provide the airbag apparatus 1 at a low cost and to make the airbag apparatus 1 compact.

Even when any of the slave sensor devices 105 through 110 fails, the bus switches 100j, 100k, 100n and 100o allow only the communication bus connected to the slave sensor device having a failure to be disconnected from the airbag ECU 100. As a result, any adverse influence on serial data from the other slave devices can be suppressed.

Third and Fourth Embodiments

Figure 5:
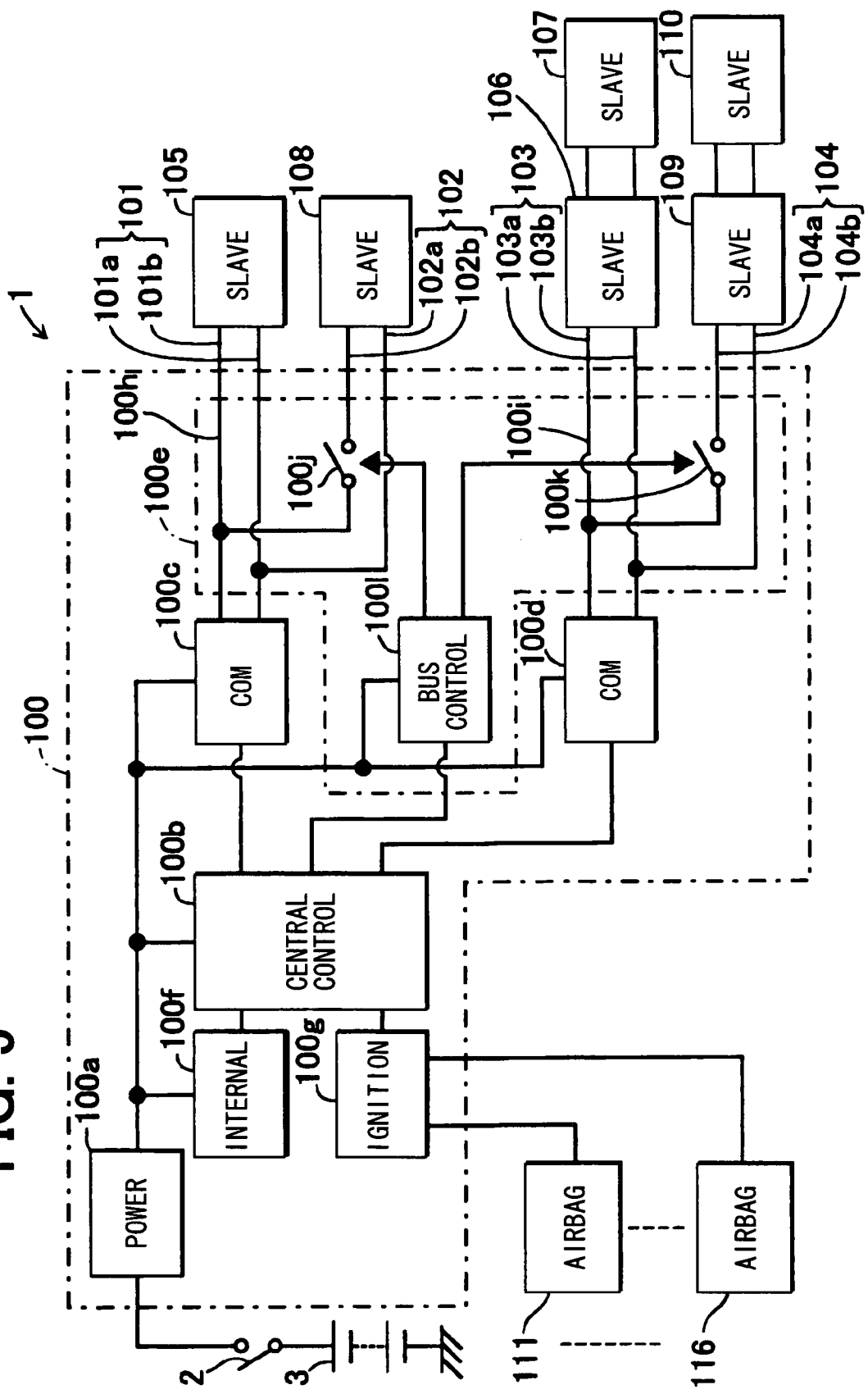
FIG. 5 is a block diagram of a communication apparatus according to a third embodiment of the invention.
Figure 6:
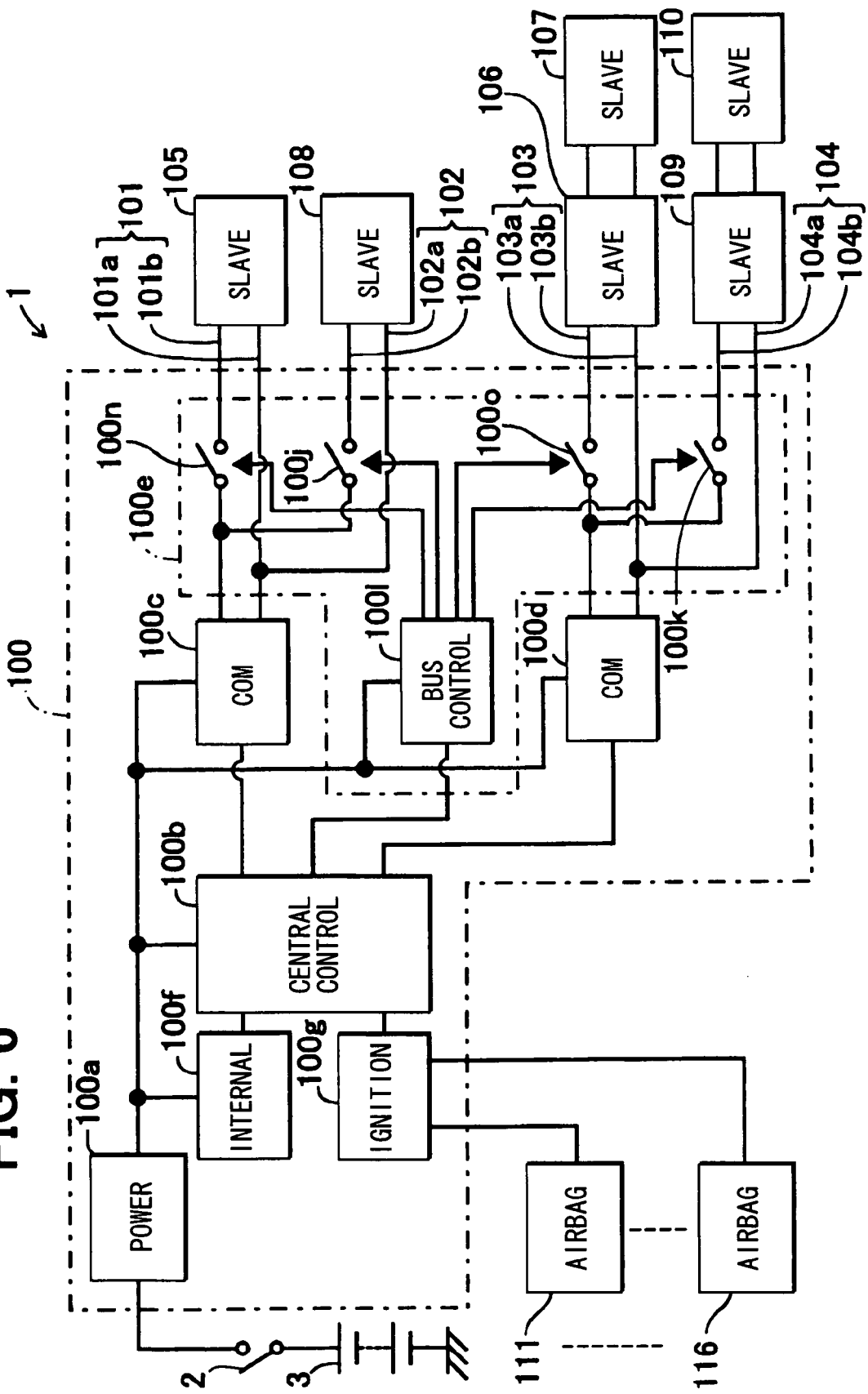
FIG. 6 is a block diagram of a communication apparatus according to a fourth embodiment of the invention.

The first and second embodiments have addressed examples in which the slave sensor devices 105 through 107 for detecting acceleration at parts of a vehicle on the left side thereof are connected to the communication circuit 100c and in which the slave sensor device 108 to 110 for detecting acceleration at parts of the vehicle on the right side thereof are connected to the communication circuit 100d. However, the first and second embodiments may be modified as shown in FIGS. 5 (third embodiment) and 6 (fourth embodiment), respectively. In these embodiments, the slave sensor devices 105 and 108 for detecting acceleration at front parts of a vehicle may be connected to the communication circuit 100c, and the slave sensor device 106, 107, 109 and 110 for detecting acceleration at side parts of the vehicle may be connected to the communication circuit 100d.

Further the above embodiments may be modified without departing from the spirit of the invention.

What is claimed is:

1. A communication apparatus comprising:
   a master device having a plurality of communication circuits for transmitting and receiving serial data;
   a plurality of communication buses over which serial data are transmitted; and
   a plurality of slave devices daisy-chain-connected to the communication circuits through respective ones of the communication buses for transmitting and receiving serial data to and from the communication circuits,
   wherein the communication circuits set addresses for the slave devices through the plurality of communication buses at the time of initial setting, and thereafter transmit and receive serial data to and from the plurality of slave devices using the set addresses, wherein
   the master device further has a communication bus connecting circuit for sequentially connecting the plurality of communication buses to the communication circuits;
   the plurality of slave devices include a right group of sensors and a left group of sensors for detecting information on a collision of a vehicle at a right side and a left side of the vehicle respectively;
   the right group of sensors are connected to one of the communication circuits and the left group of sensors are connected to another one of the communication circuits; and
   the master device is an electronic controller for controlling a passenger protection unit in the vehicle based on information on a collision of the vehicle detected by the plurality of slave devices.

2. The communication apparatus according to claim 1, wherein the master device connects one of the communication buses to the communication circuits by the communication bus connecting circuit to set an address for one of the slave devices daisy-chain-connected to the one of the communication buses, and sequentially connects another of the communication buses to sequentially set addresses for another of the slave devices daisy-chain-connected to the another of the communication buses after the address is set for the one of the slave devices.

3. The communication apparatus according to claim 1, wherein the communication bus connecting circuit includes:
   a connection wiring for connecting one of the communication buses to the communication circuits;
   a plurality of switches for switchably connecting another one of the communication buses to the communication circuits; and
   a switch control circuit for controlling switching operations of the switches.

4. The communication apparatus according to claim 3, wherein the communication circuits the plurality of switches and the switch control circuit are provided in an integral circuit.

5. The communication apparatus according to claim 1, wherein the communication bus connecting circuit includes:
- a plurality of switches for switchably connecting respective ones of the plurality of communication buses to the communication circuits; and
- a switch control circuit for controlling switching operations of the plurality of switches.

6. The communication apparatus according to claim 5, wherein the switch control circuit turns off, when any of the slave devices fails, the switch connecting the communication bus connected to the slave device having a failure to the communication circuits.

7. The communication apparatus according to claim 5, wherein the communication circuits, the plurality of switches and the switch control circuit are provided in an integrated circuit.

8. The communication apparatus according to claim 1, wherein each of the right group of sensors and the left group of sensors include sensors provided at a front side and a rear side of the vehicle.

9. A communication apparatus for a vehicle having a passenger protection unit, the communication apparatus comprising:
- a right group of slave devices provided at a right side of the vehicle for detecting a collision of the vehicle at the right side;
- a left group of slave devices provided at a left side of the vehicle for detecting a collision of the vehicle at the left side;
- a master device having a right communication circuit, a left communication circuit and a bus control circuit, the master device actuating the passenger protection unit when the collision of the vehicle at the right side or the left side is detected and information of the collision is communicated thereto;
- a right bus provided for communication between the right group of slave devices and the right communication circuit; and
- a left bus provided for communication between the left group of slave devices and the left communication circuit,
- wherein each of the right group of slave devices and the left group of slave devices includes a first sensor provided at a front side of the vehicle and a second sensor provided at a rear side of the vehicle, and
- wherein the bus control circuit is configured to sequentially connect the first sensor and the second sensor to a corresponding one of the communication circuits through a corresponding one of the communication buses.

10. The communication apparatus according to claim 9, wherein the first sensor and the second sensor are connected in series with the corresponding one of the communication circuits.

11. The communication apparatus according to claim 9, wherein the each of the right group of slave devices and the left group of slave devices includes a third sensor connected to the corresponding one of the communication circuits in parallel to the first sensor and the second sensor, and
wherein the bus control circuit is configured to connect the third sensor to the corresponding one of the communication circuits through a bus different from the bus of the first sensor and the second sensor.

12. The communication apparatus according to claim 9, wherein the first sensor and the second sensor are connected in parallel to the corresponding one of the communication circuits through two different bus parts of a corresponding one of buses.

* * * * *